(12) United States Patent
Napier et al.

(10) Patent No.: US 6,483,965 B1
(45) Date of Patent: Nov. 19, 2002

(54) METHOD OF WRITING A BRAGG DIFFRACTION GRATING

(75) Inventors: Bruce R Napier, Torquay (GB); Sotiris E Kanellopoulos, London (GB); Ricardo Feced, Old Harrow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/638,201

(22) Filed: Aug. 11, 2000

(51) Int. Cl.[7] .................................................. G02B 6/34
(52) U.S. Cl. .......................... 385/37; 359/566; 359/569
(58) Field of Search .............................. 385/37; 359/558, 359/563, 566, 568–576

(56) References Cited

U.S. PATENT DOCUMENTS 5,912,999 A * 6/1999 Brennan, III et al. ......... 385/37
6,038,358 A * 3/2000 Nishiki ........................ 385/37

OTHER PUBLICATIONS

"Group Delay Ripple and Reflectivity Increase in a Chirped Fiber Bragg Grating by Multiple–Overwriting of a Phase Mask with an Electron–Beam", Komukai et al., IEEE Photonics Technology Letters vol. 12, No. 7 Jul. 2000.*

* cited by examiner

*Primary Examiner*—John D. Lee
*Assistant Examiner*—Scott A Knauss
(74) *Attorney, Agent, or Firm*—Lee, Mann, Smith, McWilliams, Sweeney & Ohlson

(57) ABSTRACT

A method of writing a diffraction grating into a photosensitive optical transmission medium is disclosed, in which a first phase mask is used to generate an interference pattern in a second phase mask substrate and using photolithographic techniques. This produces a second phase mask, which is then use to write a diffraction grating into a photosensitive optical transmission medium. This method enables the line placement in a phase mask to be improved by averaging out the line placement errors.

11 Claims, 5 Drawing Sheets

METHOD OF WRITING A BRAGG DIFFRACTION GRATING

FIELD OF THE INVENTION

This invention relates to optical dispersion compensation and optical pulse manipulation using Bragg reflection gratings.

BACKGROUND OF THE INVENTION

The use of Bragg reflection gratings is known for causing wavelength-dependent delays, which compensate for dispersion effects. Many optical materials exhibit different responses to optical waves of different wavelengths. Chromatic dispersions, often simply referred to as "dispersion", is one well-known resulting phenomenon, in which the index of the refraction of a medium is dependent on the wavelength of an optical wave. Dispersion can cause optical waves of different wavelengths to travel at different speeds in a given medium, since the speed of light is dependent on the index of refraction. The dispersion of optical materials in general relates nonlinearly to the wavelength.

In many applications, an optical signal is composed of spectral components of different wavelengths. For example, a single-frequency optical carrier may be modulated in order to impose information on the carrier. Such modulation generates modulation sidebands at different frequencies from the carrier frequency. Also, optical pulses, which are widely used in optical data processing and communication applications, contain spectral components in a certain spectral range. The dispersion effect may cause adverse effects on the signal due to the different delays on the different spectral components.

Dispersion in particular presents obstacles to increasing system data rates and transmission distances without signal repeaters in either single-channel or wavelength-division-multiplexed ("WDM") fiber communication systems. Data transmission rates of tens of Gbit/s may be needed in order to meet the increasing demand in the marketplace. Dispersion can be accumulated over distance to induce pulse broadening or spread. Two adjacent pulses in a pulse train thus may overlap with each other at a high data rate due to dispersion. Such pulse overlapping can often cause errors in data transmission.

There have been various proposals for overcoming the dispersion effect. This invention is concerned with the use of a Bragg grating. Such gratings are known both with linearly chirped (i.e. varying) grating periods and with non-linearly chirped graft periods, in order to achieve the desired spectral response along the length of the optical carrier (fiber or waveguide).

A spectral component in an optical signal with a wavelength satisfying a Bragg phase-matching condition is reflected back from a Bragg grating. Other spectral components are transmitted through the grating. The Bragg phase-matching conditions at different positions in the fiber grating are differentiated by the chirping of the grating period, so that the resonant wavelength of the fiber grating changes with the position. As the grating period increases or decreases along a direction in the fiber grating, the resonant wavelength increases or decreases accordingly. Therefore, different spectral components in an optical signal are reflected back at different locations and have different delays. Such wavelength-dependent delays can be used to negate the accumulated dispersion in a fiber or waveguide link.

To use a chirped Bragg grating, an optical circulator is typically used to couple the input optical signal to the grating and to route the reflected signal. An optional optical isolator may be placed at the other end of the grating to reject any optical feedback signal.

A common method of writing a Bragg grating uses a phase mask in the form of an etched fused silica grating, to form a light interference pattern, which then illuminates a photosensitive optical carrier to alter the refractive index characteristics. The phase mask is generally made using holography or electron beam lithography. In order to write a fiber grating of pitch p, a phase mask of pitch 2p is written and illuminated at normal incidence with coherent radiation of an appropriate UV wavelength to photoactivate the fiber.

One of the main problems with this method of production is that any errors on the phase mask are translated into errors of some form in the actual fiber grating itself. Holographic writing techniques are not ideally suited for chirped gratings, because many grating lines are written simultaneously, with overlap between successive writing operations. Phase masks produced using electron beam lithography have extremely good precision over many lines, but there is a line placement error on each of the individual grating lines. This is because each line is exposed individually by the electron beam process. This does, however, make the process particularly suited to the manufacture of chirped gratings. Relative movement is ultimately controlled by an interferometer device, which in the past has imposed a maximum accuracy of around 5 nm, although recent developments are enabling increased positioning accuracy. The electron beam itself has a width of approximately 150 nm–200 nm, and a typical grating pitch of the phase mask is 1070 nm. The random placement error leads to imperfections in the interference pattern written into the fiber that manifests itself as a rise in the out-of-band reflectivity of the reflection spectrum of the fiber grating and also as a source of delay ripple in the delay characteristics of the grating.

Line placement errors also arise in phase masks manufactured using other techniques, for example hybrid holographic techniques, which are frequently used for generating phase masks with nonlinear chirp functions.

A phase mask is composed of stitched sections or segments typically 0.1 to 1 mm in length, determined by the field size of the e-beam machine. These stitched segments produce a stitch error which is highly periodic and leads to side lobes in the fiber grating reflection spectrum. These are highly problematic for similar reasons to those described for the random line placement error above. This error, in older e-beam machines was typically 10–20 nm, but has been improved to less than approximately 5 nm using more recent technology. Still more sophisticated slurring techniques have recently been reported which distribute the stitch over a region of mask rather than occurring all at one point and have led to improved side lobe suppression.

Typically, a phase mask produces a fiber grating up to 100 mm in length. If a longer grating is required then a number of gratings patches are joined together. In order to obtain a single uninterrupted continuous grating, the precision of the patch positions must be much better than the grating pitch. In practice, even with highly sophisticated alignment techniques, there is always a stitch-error which leads to severe degradation of the grating performance.

SUMMARY OF THE INVENTION

According to the invention, there is provided a method of writing a diffraction grating into a photosensitive optical transmission medium, comprising the steps of:

using a first phase mask to generate an interference pattern in a second phase mask substrate and using photolithographic techniques to create a second phase mask;

using the second phase mask to write a diffraction grating into a photosensitive optical transmission medium.

The method of the invention enables the line placement in a phase ask to be improved by averaging out the line placement errors. This is achieved by carrying out a multiple-stage phase mask creation process, by a first phase mask is used to create holographically a second phase mask, rather than being used to write the grating into the fiber or waveguide.

The first phase mask may be manufactured using electron beam photolithographic techniques.

The medium preferably comprises an optical fiber and the first phase mask preferably a chirped grating period.

The generation of an interference pattern in the second phase mask substrate uses a UV beam which illuminates the first phase mask perpendicularly to the longitudinal axis of the first phase mask. This means that the pitch of the written grating is half of the pitch of the phase mask used to write the grating. Therefore, the first phase mask preferably has a pitch of 4 times the pitch of the desired grating, as a result of the two stage process.

The invention also provides a method of writing a diffraction grating into a photosensitive optical transmission medium, comprising the steps of:

(i) using a first phase mask to generate an interference pattern in a second phase mask substrate and using photolithographic techniques to create a second phase mask;

(ii) carrying out at least one further phase mask manufacture process, the at least one further phase mask process starting with the a previously created phase mask and producing a further phase mask by generating an interference pattern in a further phase mask substrate and using photolithographic techniques, the at least one further process resulting in a final phase mask; and (iii) using the final phase mask to write a diffraction grating into a photosensitive optical transmission medium.

In this method, a repetitive phase mask writing process is adopted, each stage in the process improving the errors in line placement. When using normal exposure of the mask, the pitch of the first mask will be $2^{(n+2)}.p$, wherein n is equal to the number of further phase mask manufacture processes and p is the desired pitch of the fiber grating. The case of n=0 corresponds to the two-gage process above with the mask having a pitch of 4p.

According to a second aspect of the invention, there is provided a phase mask for writing a diffraction grating with a pitch p into a photosensitive optical transmission medium, comprising a phase mask written using electron beam lithography having a pitch of $2^{(n+2)}.p$, wherein n is greater than or equal to 0.

The invention enables the delay ripple in a chirped grating to be reduced, and according to a third aspect of the invention, there is provided a chirped diffraction gating written using a phase mask and having a mean group delay ripple of less tan 5 ps, and preferably below 2.5 ps.

BRIEF DESCRIPTION OF THE DRAWINGS

An example of the invention will now be described in detail with reference to the accompanying drawings, in which.

DETAILED DESCRIPTION

Figure 1:
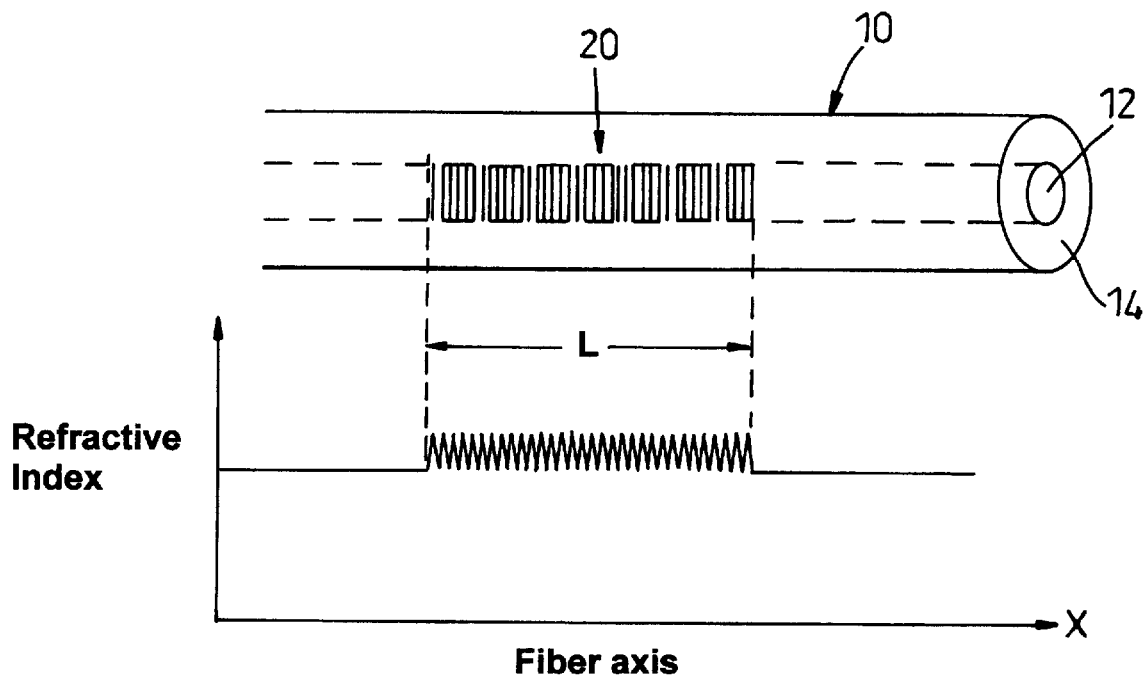
FIG. 1 shows an optical fiber with a diffraction grating in the core.

This invention concerns the use of gratings within optical transmission media. For example, such gratings can be used for overcoming the dispersion effect within those media. Gratings may be used to define wavelength-selective reflects. Other uses of diffraction gratings in optical transmission media will be known to those skilled in the art. FIG. 1 illustrates a schematic of a fiber grating.

An optical fiber 10 having a grating 20 of length L is illustrated in FIG. 1. The fiber 10 usually comprises silica, although other embodiments known in the art may use plastics compounds. The optical fiber 10 includes a core 12 and one or more cladding layers 14. The grating 20 is a series of periodic, aperiodic or pseudo-periodic variations on the core 12 and/or one or more of the cladding layer 14 of the fiber. As illustrated in the matched plot shown in FIG. 1, the grating 20 consists of variations in the refractive index of the fiber 10.

Figure 2:
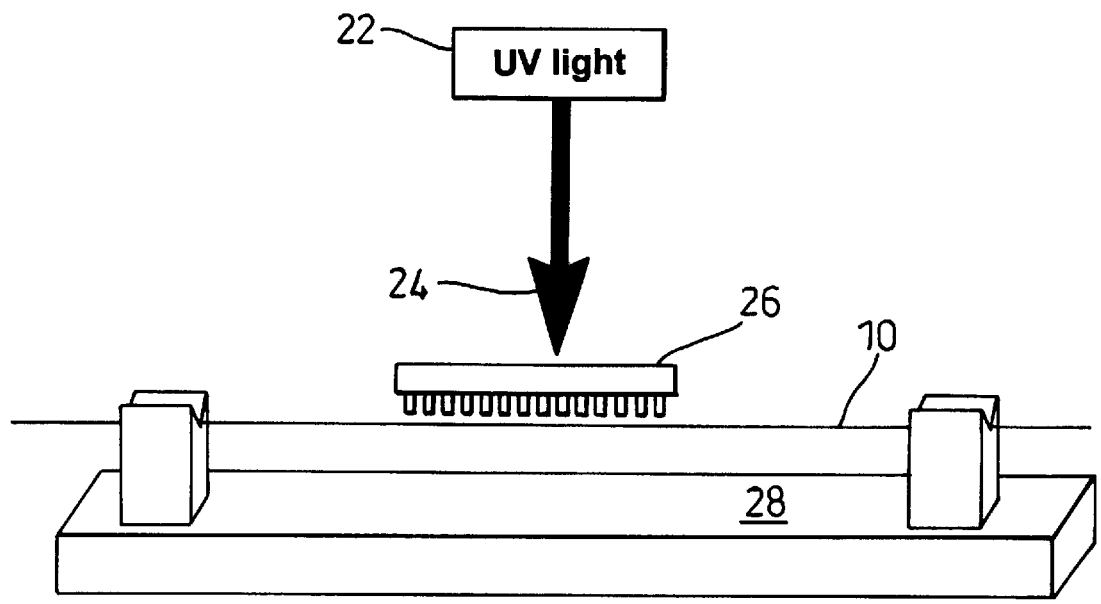
FIG. 2 is used to explain the known technique of forming a diffraction grating in an optical fiber cord.

While there are many methods for establishing a refractive-index grating within a fiber, the most practical methods involve exposing photosensitive fibers to patterned light. The index of refraction of certain fiber-optic materials, such as germanium-doped silica, is changed upon exposure to mid-ultra-violet (maid-UV) light, e.g., wavelengths between 190 nanometers (nm) and 270 nm. The photosensitivity of such a fiber can be enhanced by hydrogen loading, FIG. 2 schematically illustrates a known index writing assembly for exposing photosensitive fibers to patterned light, and includes a source of light 22 producing a beam 24, an interference pattern generator 26, and a fiber holding assembly 28 used to hold a fiber 10. Germanium or other photosensitive dopants are added to the silica glass of a region of the fiber 10, making the refractive index of that region of the optical fiber susceptible to change, generally an increase, upon exposure to actinic radiation. Commercially available photosensitive fibers may be used. A similar method may be used to modify the refractive index not only of optical fibers, but also of other waveguides, such as planar waveguides.

The radiation source 22 is a source of actinic radiation, such as a UV laser light or X-ray radiation The source of light is selected to deliver a beam of sufficient intensity and having a suitable diameter to write the desired grating. Other sources of light known in the art may be used depending on the type of fiber or waveguide used and the desired grating pattern Lasers for altering the refractive index of fibers that span the above maid-UV wavelength range include ArF excimer lasers with a laser output at 193 nm the fourth harmonic of a 1064 nm Nd:YAG laser at 266 nm, KrF excimer laser emitting at 248 nm and frequency doubled Argon laser operating at 244 nm.

The interference pattern generator 26 creates an intensity distribution having a period p and is positioned between the fiber 10 and the source of light 22. The period of the intensity distribution generally matches the desired fiber grating pitch. An intensity distribution is a spatially varying repeating light intensity pattern, which can be periodic or quasi-periodic, such as, for example, an interferogram. The interference pattern generator 26 is a phase mask of period 2p, although the grating period can be increased slightly by tilting the mask slightly relative to the core.

The phase mask can be a block of material with a surface relief pattern that acts as a series phase grating. Light originally directed transversely with respect to fiber is split into rearwardly and forwardly directed beams that interfere with each other at core 12. This interference at photosensitive core 12 results in the formation of refraction-index grating 20. Even low-coherence lasers, such as excimer lasers, can be used with such a phase mask, and the phase mask is typically formed of fused silica.

Figure 3:
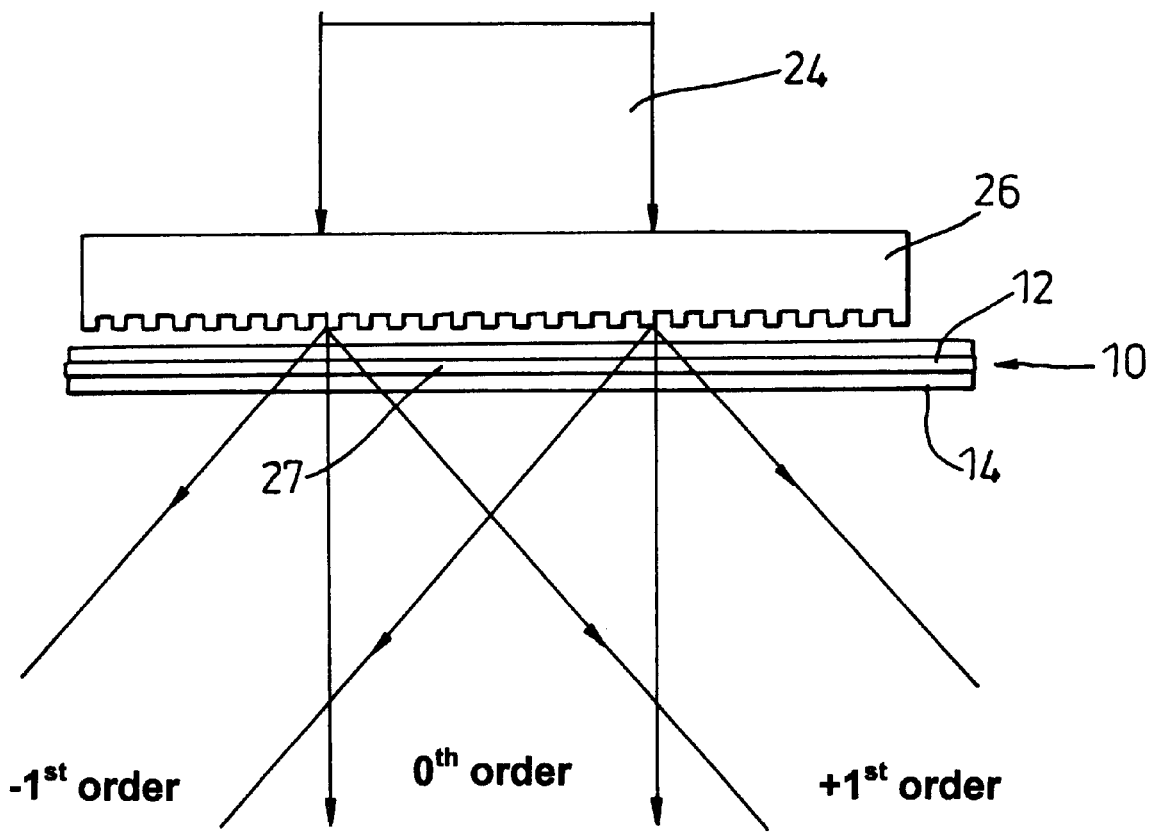
FIG. 3 is used to explain in greater detail the phase mask method of manufacturing a diffraction grating.

FIG. 3 is used to explain in greater detail the writing of the interference pattern into the fiber. The UV beam 24 is incident normally on the fiber 10 and is diffracted by the phase mask 26 into the various orders of diffraction. The mask 26 is etched to a line depth such that of the zeroth order (i.e. straight through) beam is suppressed. On a good mask, typically ~70% of the energy is transferred into the two first order beams with less than 5% in the zeroth order. These two first order beams overlap in a small region of space 27 close to the mask forming an interference pattern of pitch p.

A Bragg grating of uniform pitch can be generated using a phase mask of uniform pitch. Similarly a chirped Bragg grating, namely a grating with grating elements having varying optical pitch, can be generated using a phase grating of non-uniform pitch.

The fused silica can be etched with an appropriate square-wave surface relief pattern using electron-beam lithography. As mentioned above, random errors in line placement of the individual surface relief lines occur in this process.

Figures 4A, 4B, 4C:
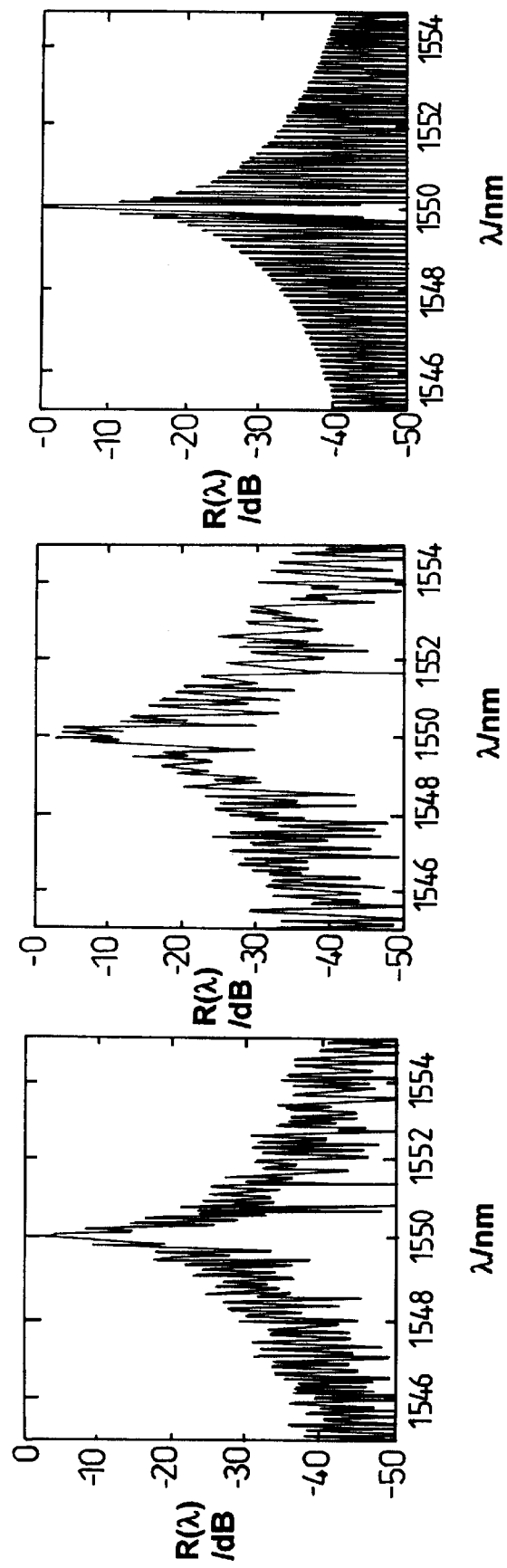
FIG. 4 shows the reflection spectra from a uniform pitch diffraction grating assuming different degrees of line placement error.

FIG. 4 shows the effect of this random error on the reflection spectrum from a uniform period fiber grating. The two graphs in FIGS. 4(*a*) and 4(*b*) both correspond to simulations of the reflection spectrum from a 15,000 period grating (~8 mm long) with different random errors on the line placement. Both have Gaussian error distributions; the first has a standard deviation of 0.21 nm and the second 1.49 nm. FIG. 4(*c*) shows the simulated reflection spectrum of a perfect 8 mm grating.

It is clear that as the line placement error increases, the sidelobes of the pattern change: the skirts of the pattern rise and become increasingly ragged. This out-of-band reflectivity leads to serious problems in high performance gratings applications.

For example, where gratings are used as high finesse reflection filters, the reflection bandwidth is increased. When many gratings are concatenated in DWDM applications: the overlapping of many weak tails from neighbouring filters leads to crosstalk between channels. In dispersion compensating gratings, a very precise shape reflection spectrum is required. In these chirped gratings, different skirt arise from different points on the grating leading to delay ripple on the grating response.

The invention is based on the recognition that the line placement error provides a limitation to the quality of Bragg gratings. Improvement in the line placement error will improve the performance of the gratings, despite other limitations, such as the electron beam diameter. It has been found that the limitation in line placement accuracy is a result of limitations in the interferometer accuracy used for position control. The invention is further based on the recognition that the grating recorded in the fiber will have an improved periodicity compared with the phase mask from which it was made, because the holographic fringe formation smoothes the random line placement error. Each fringe recorded in the fiber grating is a result of a holographic process and includes contributions from many lines on the phase mask. The contribution from many phase mask lines causes an averaging of the line placement error.

According to the invention, the phase mask including the line placement errors is not used to write the Bragg grating in the optical fiber or optical waveguide, but is instead used to manufacture an improved second phase mask. This second phase mask is thus written using holographic exposure of a photo-resist which is then chemically etched to create an improved phase mask, which is then used in conventional manner to write the desired interference pattern into the photosensitive optical transmission medium.

If a fiber grating of pitch p is required then a phase mask of pitch 4p will typically be manufactured. This mask is scanned with a laser beam into a suitable photoresist and the resulting pattern is processed to form the second phase mask which will have the random error smoothed out by the holographic process. This phase mask will have a pitch of 2p, and thus when used to write a fiber grating in the usual way will produce the required pitch of p.

It should be noted that the process can be repeated more than once In other words, a phase mask may be used to manufacture an improved phase mask a number of times before the eventual phase mask is used to write the Bragg grating in the optical transmission medium. Each time a phase mask is used in a holographic writing process, the rife placement errors are averaged out further.

The smoothing effect mentioned above will now be explained in harder detail. It has been observed experimentally for a mask-fiber spacing of 65 $\mu$m that a discrete stitch error in a phase mask effects the fiber grating up to ±100 $\mu$m away. This corresponds to approximate calculations of the effect of contributions to the intensity distribution according to the Kirchoff obliquity factor.

Figure 5:
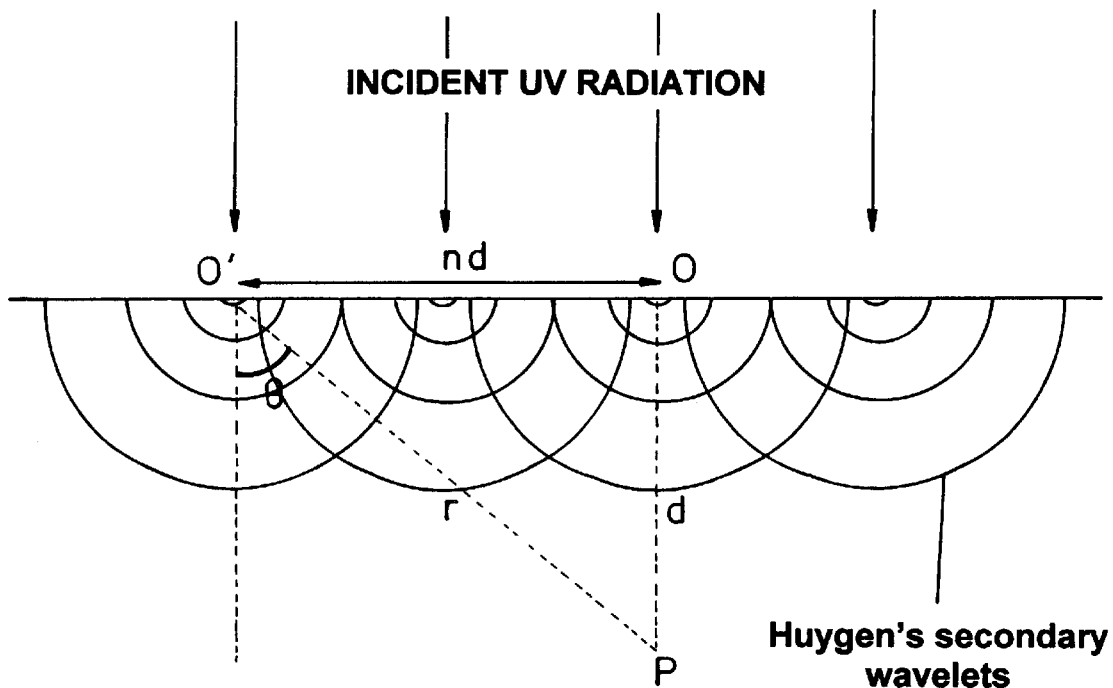
FIG. 5 is used to explain the influence of different phase mask lines in the writing of individual lines of the diffraction grating.

FIG. 5 shows a pattern recorded in a fiber which will be used to explain the contribution of the phase mask pattern to individual points in the fiber. All points on the wavefront from the phase mask will contribute to the recorded field at any particular point P with a certain weight. The steeper the angle between point P and the wavefront, the smaller the contribution. Also, the further the point P is away, the more the wavefront will diverge, reducing its intensity.

The formulation for the obliquity factor proved by Kirchoff is given by:

$$K(\theta) = \frac{1}{2}(1 + \cos\theta) \qquad (1)$$

where $\theta$ is the angle between the normal of the incident wavefront and the condone directed towards P, as illustrated in FIG. 5. Furthermore, the magnitude of this wavelet will decrease with the square of the distance O'P, where:

$$O'P = r = \sqrt{d^2 + (nd)^2} = d\sqrt{1+n^2} \qquad (2)$$

In this equation, d is the normal distance between the point P in the fiber and the phase mask, and point O' is defined to be a distance nd from point O. Thus the magnitude of the amplitude at P from a unit magnitude incident wave at O' is given by:

$$A_{O'} = \frac{1}{r^2} \cdot K(\theta) = \frac{1}{d^2(1+n^2)} \cdot \frac{1}{2}\left(1 + \frac{1}{\sqrt{1+n^2}}\right) \qquad (3)$$

Similarly the magnitude of the ray from O is simply:

$$A_O = \frac{1}{r^2} \cdot K(\theta) = \frac{1}{d^2} \cdot \frac{1}{2}(1 + \cos 0) = \frac{1}{d^2} \qquad (4)$$

Hence the ratio of the contributions from O' and O is simply:

$$\frac{A_{O'}}{A_O} = \frac{1}{2(1+n^2)}\left(1 + \frac{1}{\sqrt{1+n^2}}\right) \qquad (5)$$

Figure 6:
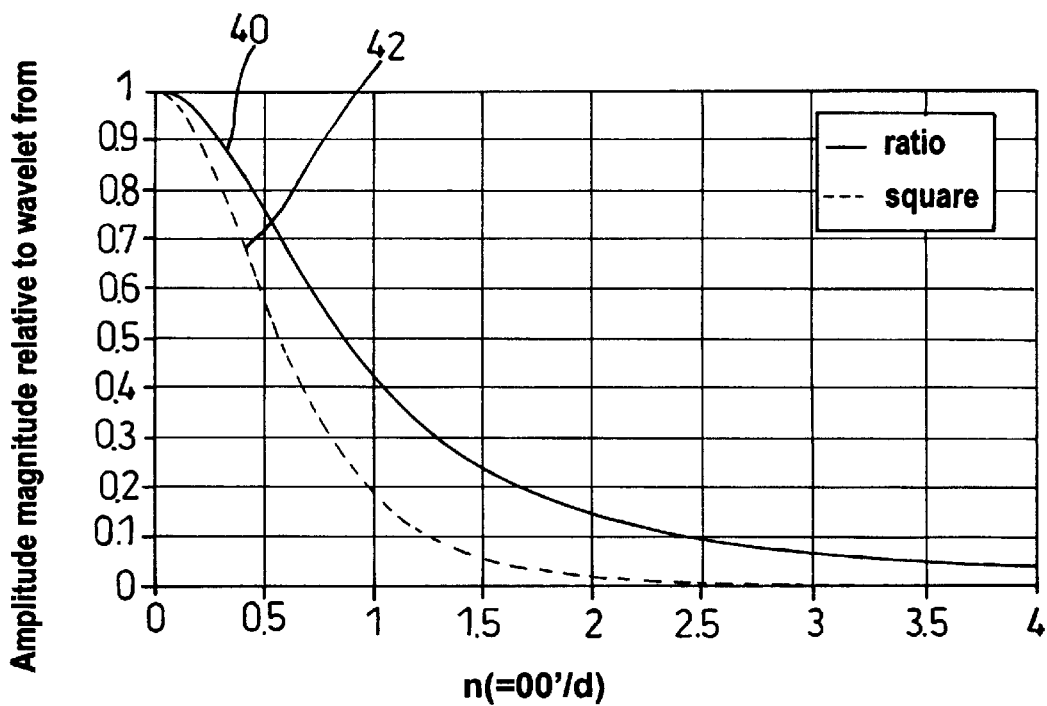
FIG. 6 is a curve illustrating the influence of different phase mask lines in the writing of individual lines of the diffraction grating.

This function is plotted as curve 40 in FIG. 6, The intensity at P will be the square of the total amplitude and so also plotted as curve 42 is the square of this function. It is recognised that this function is only a rough indication of the importance of the contribution from a general point. The actual importance depends strongly on the nature of the whole wavefront: obviously its periodicity and shape are crucial in determining the nature of the resulting pattern. The graph is intended simply to give a guide to how much of the phase mask contributes to each grating line.

Thus, in this example, the pattern formed will contain significant contributions from light from points up to approximately 2d from O. The random line placement error associated with these fringes will be averaged and the pattern uniformity improved. The larger the fiber-mask spacing, the more fringes contribute and the better the pattern perfection. However, because of the fixed angle of the two superposed beams from the phase mask, there is a limit to how large the separation may be whilst maintaining the fiber in an area of overlap.

Typically, a fiber core in the fabricated grating will be placed at a distance of ~100 micrometers behind the face of the phase mask, Significant contributions from the mask are expected according to the above argument over a length scale of up to around 200 micrometers, which for a mask intended for use at 1550 nm (with a period of 1.07 m) would contain about 200 periods.

Experimental results from uniform period fiber gratings written with phase masks made by electron beam lithography have shown a line placement error with a standard deviation of ~0.21 nm per grating period. The line placement error of the fiber grating can be estimated by the height of the skirts around the main Bragg reflection in the reflection spectrum. The random error in the phase mask is expected to scale with the square root of the number of scattering centres. Experimental results confirm this approach to be reliable, obtaining expected random line placement of ~2.5 nm in the mask. This is consistent with the interferometer accuracy in the electron beam writing process, supporting the assertion that the line placement error in the mask limit the quality of the reflection spectrum, As described above, chirped fiber gratings are commonly used to compensate the dispersion of optical communication links. The three main requirements for a dispersion compensator are: low insertion loss, flat amplitude response and a smooth group delay with minimal group delay ripple. Random phase errors imprinted in the grating give rise to enhanced fluctuations in the time-delay of its spectral response, degrading its performance as a dispersion compensator. The dependence of the time-delay-ripple standard deviation on the fabrication parameters is described in the following equation:

$$\sigma \propto \frac{\kappa}{\sqrt{R}} \frac{1}{\alpha^{3/2}} \frac{1}{\sqrt{L_{coh}}} \qquad (7)$$

where $\kappa$ is the coupling constant, R is the grating reflectivity and $\alpha$ is its chirp parameter. $L_{coh}$ is a characteristic coherence length, which describes the loss of coherence of the writing process, and ideally must be much longer than the total grating length. $\kappa$, R and $\alpha$ are design parameters determined by the targeted application. The standard deviation of the time-delay-right is thus inversely proportional to the square root of the coherence length, which measures the quality of the fabrication system.

Thus, the fabrication process is required to provide long coherence lengths in order to minimise this negative effect, and the process of the invention improves this coherence length value by reducing the lie placement errors.

Figure 7:
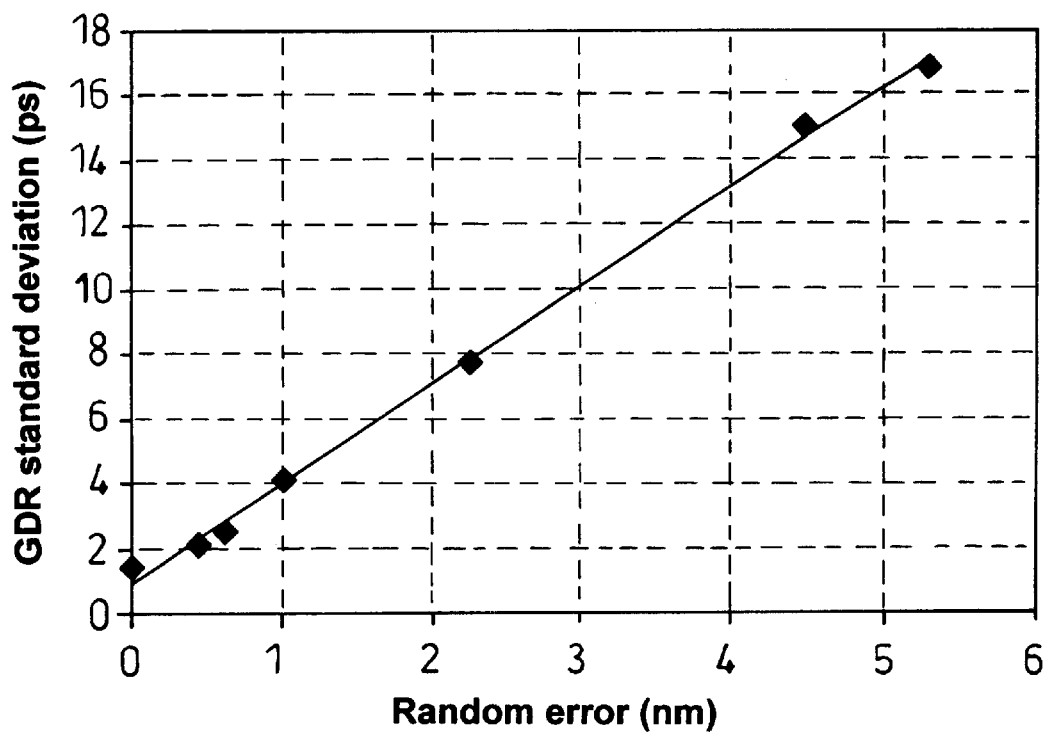
FIG. 7 shows the group delay ripple for a chirped fiber grating as a function of the line placement error.

The improved phase mask line positioning achieved by the invention thus enables the group delay ripple in a chirped fiber grating to be improved. FIG. 7 shows the relationship of Group Delay Ripple (GDR) in a chirped fiber grating (11.5 cm long) as a function of random phase error in the grating. Known chirped gratings may achieve a GDR of approximately 14–16 ps which is consistent with a random error of about 4.5 nm. A reduction of the phase error in the grating by a factor of ten, which can be achieved using a two stage mask writing process, can limit the GDR to below 2 ps.

Figure 8:
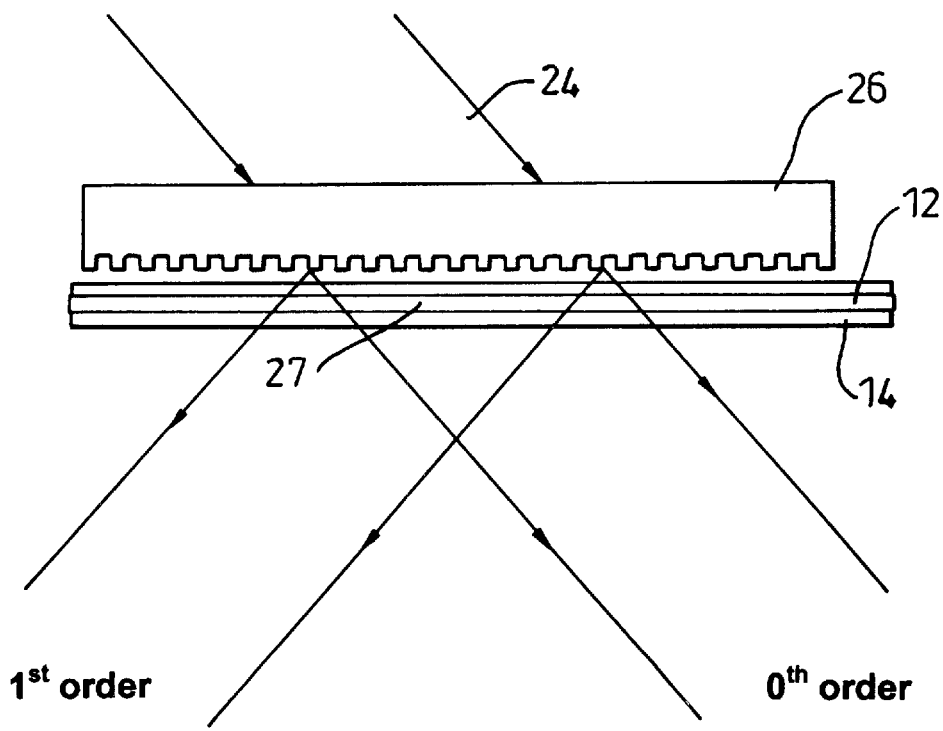
FIG. 8 is used to explain an alternative phase mask method of manufacturing a diffraction grating.

The grating writing procedure described with reference to FIG. 3 uses UV irradiation at normal incidence. This generates an interference pattern between the +1 and -1 diffraction orders. This will record a Sing with half the period of the master mask. An alternative writing technique enables use of an electron beam generated phase mask with a period equal to the desired period p of the grating. This alternative technique is illustrated in FIG. 8, in which irradiation is by a UV beam at an oblique angle of incidence. In this case, an interference pattern between the 0 and +1 diffraction orders can be used to record a grating with the same period as the original master, This writing technique can also be used in the invention.

The description above refers to a first mask manufactured using e-beam lithography. However, other phase mask manufacturing techniques also suffer from line placement errors, and can therefore be improved using the technique of the invention, For example, a hybrid holographic technique uses multiple exposures an precise translations (integer multiples of the local grating period) of the substrate on which the master grating is recorded. Such hybrid holographic techniques can be used to generate master phase masks with arbitrary nonlinear chirp functions, which are almost impossible to generate with classical holographic techniques.

As discussed above, stitch errors also reduce the performance of Bragg gratings. For masks written with slurring techniques the magnitude of the stitch error is greatly reduced, but there is inevitably still a distributed periodic error associated with the necessity of the discrete nature of the field size. When this pattern is transferred into the fiber grating, this periodicity will still exist, although in an even more distributed form. Distributed stitch errors should also be lessened by the holographic transfer of the phase mask pattern, and the invention also enables a reduction in stitch errors.

Modifications and variants of the invention will be apparent to those skilled in the art. The embody described is intended to be by way of example only and is not intended to be limiting. The scope of the invention is defined by the attached claims.

We claim:

1. A method of writing a diffraction grating into a photosensitive optical transmission medium, comprising the steps of:

using a first phase mask to generate an interference pattern in a second phase mask substrate and using photolithographic techniques to create a second phase mask; and using the second phase mask to write a diffraction grating into a photosensitive optical transmission medium.

2. A method according to claim 1, wherein the first phase mask is manufactured using electron beam photolithographic techniques.

3. A method according to claim 1, wherein the medium comprises an optical fiber.

4. A method according to claim 1, wherein the first phase mask has a chirped grating period.

5. A method according to claim 1, wherein the generation of an interference pattern in the second phase mask substrate uses a UV beam which illuminates the first phase mask perpendicularly to the longitudinal axis of the first phase mask.

6. A diffraction grating in an optical transmission medium written using the method of claim 1.

7. An optical transmission system comprising nodes interconnected wit optical transmission media, the system further comprising delay compensation elements comprising chirped gratings manufactured according to the method of claim 1.

8. A method of writing a diffraction grating into a photosensitive optical transmission medium, comprising the steps of:

(i) using a first phase mask to generate an interference pattern in a second phase mask substrate and using photolithographic techniques to create a second phase mask;

(ii) carrying out at least one further phase mask manufacture process, the at least one fixer phase mask process starting with the a previously created phase mask and producing a further phase mask by generating an interference pattern in a further phase mask substrate and using photolithographic techniques, the at least one further process resulting in a final phase mask; and (iii) using the final phase mask to write a diffraction grading into a photosensitive optical transmission medium.

9. A method according to claim 8, wherein the first phase mask is manufactured using electron beam photolithographic techniques.

10. An optical transmission system comprising nodes interconnected with optical transmission media, the system further comprising delay compensation elements comprising chirped gratings manufactured according to the method of claim 8.

11. A phase mask for writing a diffraction grating with a pitch p into a photosensitive optical transmission medium, comprising a phase mask written using electron beam lithography having a pitch of $2^{(n+2)} \cdot p$, wherein n is greater than or equal to 0.

* * * * *